United States Patent
Chen et al.

(10) Patent No.: US 9,143,929 B1
(45) Date of Patent: Sep. 22, 2015

(54) METHODS AND DEVICES CONFIGURED FOR IP ADDRESS CONFLICT DETECTION AND RESOLUTION UPON ASSIGNMENT OF WAN IP ADDRESS

(71) Applicant: Western Digital Technologies, Inc., Irvine, CA (US)

(72) Inventors: Paul Chen, Huntington Beach, CA (US); Derek Hee Jun Cha, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 143 days.

(21) Appl. No.: 13/716,026

(22) Filed: Dec. 14, 2012

(51) Int. Cl.
  *H04W 8/26* (2009.01)
  *H04L 29/12* (2006.01)
(52) U.S. Cl.
  CPC ......... *H04W 8/265* (2013.01); *H04L 29/12264* (2013.01); *H04L 29/12933* (2013.01)
(58) Field of Classification Search
  CPC .................... H04L 2012/5618; H04W 8/265
  USPC ........... 370/252, 389, 392, 466; 709/220, 221
  See application file for complete search history.

(56) References Cited

U.S. PATENT DOCUMENTS

| | | | |
|---|---|---|---|
| 6,912,223 B1 | 6/2005 | Sloane | |
| 6,917,626 B1 | 7/2005 | Duvvury | |
| 7,080,141 B1 | 7/2006 | Baekelmans et al. | |
| 7,245,618 B2 | 7/2007 | Ito et al. | |
| 7,526,536 B2 | 4/2009 | Bhogal et al. | |
| 7,565,418 B2 | 7/2009 | Ferrari et al. | |
| 7,623,515 B2 | 11/2009 | Breuer et al. | |
| 7,631,045 B2 | 12/2009 | Boerries et al. | |
| 7,633,855 B2 | 12/2009 | Singh et al. | |
| 8,156,207 B2 | 4/2012 | Wood et al. | |
| 2002/0161867 A1 | 10/2002 | Cochran et al. | |
| 2006/0277299 A1 | 12/2006 | Baekelmans et al. | |
| 2007/0022185 A1 | 1/2007 | Hamilton et al. | |
| 2007/0028000 A1 | 2/2007 | Ebbesen et al. | |
| 2007/0133544 A1* | 6/2007 | Shida | 370/392 |
| 2007/0268506 A1 | 11/2007 | Zeldin | |
| 2007/0299942 A1* | 12/2007 | Lu et al. | 709/220 |
| 2009/0073990 A1 | 3/2009 | Patil et al. | |
| 2009/0198800 A1 | 8/2009 | Dighe et al. | |
| 2010/0199344 A1 | 8/2010 | Ling et al. | |
| 2010/0211659 A1* | 8/2010 | Chen et al. | 709/221 |
| 2011/0286447 A1* | 11/2011 | Liu | 370/389 |
| 2011/0299538 A1* | 12/2011 | Maruta | 370/392 |
| 2012/0120934 A1 | 5/2012 | Cho | |

* cited by examiner

*Primary Examiner* — Brian D Nguyen
*Assistant Examiner* — Toan Nguyen

(57) ABSTRACT

A device comprising a router may be configured to couple to a gateway device and may be configured, upon being assigned a Wide Area Network (WAN) Internet Protocol (IP) address by the gateway device, to iteratively: (1) determine whether a LAN IP address of the device conflicts with the assigned WAN IP address; and (2) change the LAN IP address of the device if the LAN IP address of the device conflicts with the WAN IP address assigned by the network gateway.

14 Claims, 5 Drawing Sheets

METHODS AND DEVICES CONFIGURED FOR IP ADDRESS CONFLICT DETECTION AND RESOLUTION UPON ASSIGNMENT OF WAN IP ADDRESS

BACKGROUND

A great many consumers purchase wireless routers for home use. Often, such consumers are technological neophytes and cannot successfully handle even relatively simple manual router configuration tasks. Even for technologically-sophisticated users, however, the present expectation is that even complex devices such as routers will install and work right out of the box, in the same manner as a common household appliance. Toward that end, many routers are configured with a Web-based user interface (UI) designed to guide the user, often using a wizard, through the installation process. However, in the event the router encounters an Internet Protocol (IP) address conflict, the consumer may not even be able to access the Web UI if the consumer cannot even access the router. Routers are typically sold configured with a default Local Area Network (LAN) IP address. Different manufacturers commonly ship routers pre-configured with different default LAN IP addresses. For example, if a router is pre-configured with a default LAN IP address and is assigned, during installation, a Wide Area Network (WAN) address that is in the same subnet as the LAN IP address, a conflict exists and the router may be effectively unusable until the IP address conflict is resolved.

Such conflict may occur, for example, when the consumer connects the router to the modem or other network gateway device and powers the router up before being instructed to do so by the router configuration wizard. Dynamic Host Configuration Protocol (DHCP) could then assign the router a LAN IP address that conflicts with the WAN IP address assigned by the modem, thereby preventing the consumer from accessing and using the router's Web UI. Understandably, this may result in confusion, frustration and may contribute to an unfavorable opinion on the user-friendliness of the manufacturer of the router.

DETAILED DESCRIPTION

Figure 1:
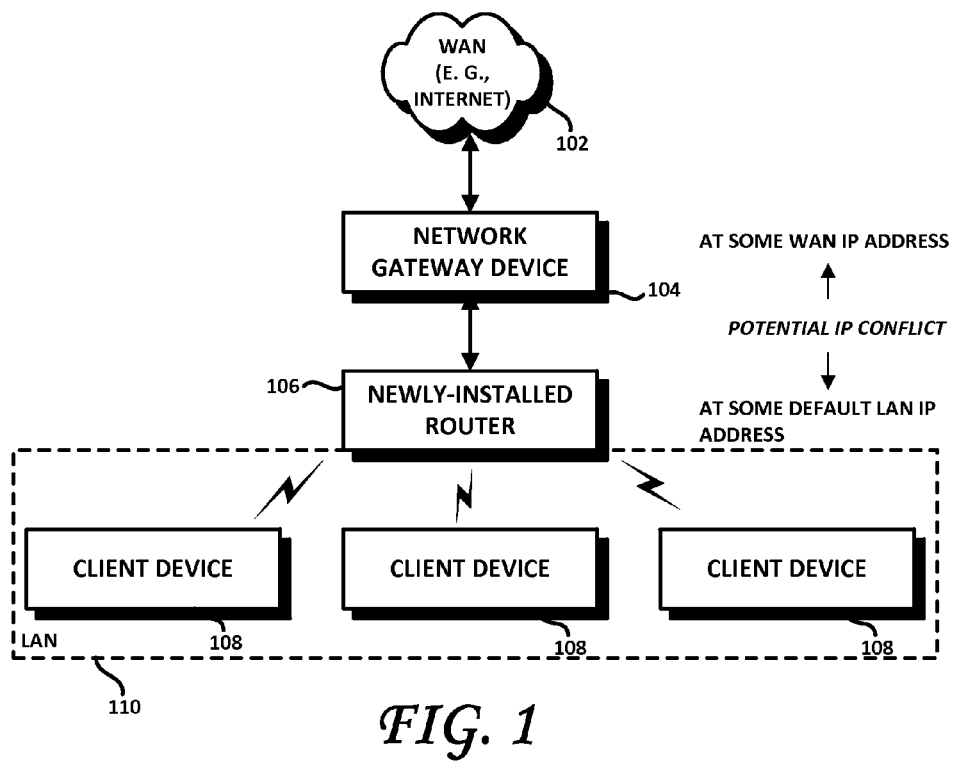
FIG. 1 is a diagram of a system that illustrates potential IP address conflicts that can occur when installing a new router.

FIG. 1 is a diagram of a system that illustrates potential IP address conflicts that can occur when installing a new router. As shown therein, a network gateway device 104 may be coupled to a network 102 that may comprise, for example, the Internet. For example, the network gateway device may comprise a modem. A newly-installed router 106, often just freshly removed from its packaging, may be prematurely powered up and connected to the network gateway device 104, often before the consumer is directed to do so by the instructions or a software installation wizard. FIG. 1 also shows client computing devices 108 in a local area network (LAN) 110, which client computing devices 108 may be searching for an Access Point to access the network 102 through the network gateway device 104.

Figure 2:
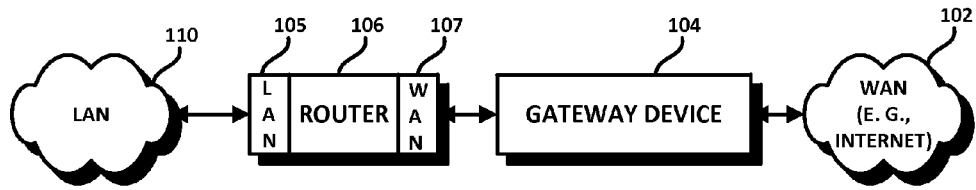
FIG. 2 graphically shows the LAN IP address and the WAN IP address of a router installed between a LAN and a network gateway device coupled to a network comprising, for example, the Internet.

FIG. 2 graphically shows the LAN IP address 105 and the WAN IP address 107 of a router 106 installed between a LAN 110 and a network gateway device 104 coupled to a network 102 comprising, for example, the Internet. Despite clear directions to the contrary in the "Easy Setup" procedures that may ship with new routers, users sometimes plug in their new router to the modem 104 and power them up prematurely. This may cause an IP address conflict if the router is assigned a LAN IP address that conflicts with the modem's WAN IP address. According to one embodiment, to prevent such an IP address conflict, as soon as the router is plugged in to the modem and powered up and receives a WAN IP address, an address conflict check may be automatically carried out. If the router and modem are on the same subnet (e. g., 192.168.1.x) a conflict has occurred. Upon detection of such conflict, remedial action may be automatically taken, according to one embodiment, by iteratively assigning a LAN IP address to the router and detecting conflicts until a LAN IP address is found that does not conflict with the modem's WAN IP address. According to one embodiment, the router's LAN IP address may be changed to a different subnet than the modem's WAN IP address is on (e. g., 192.168.6.x). As noted above, an iterative process may be carried out if needed to detect further conflicts and to repeatedly change the LAN IP address of the router until no conflict is detected. According to one embodiment, when the LAN IP address of the router 106 no longer conflicts with the router's WAN IP address assigned by the network gateway device 104, the router's current (e.g., factory default) LAN IP address may be overwritten. An Internet connectivity check may then be performed after the IP conflict resolution to verify that the router can indeed connect to the Internet.

Figure 3:
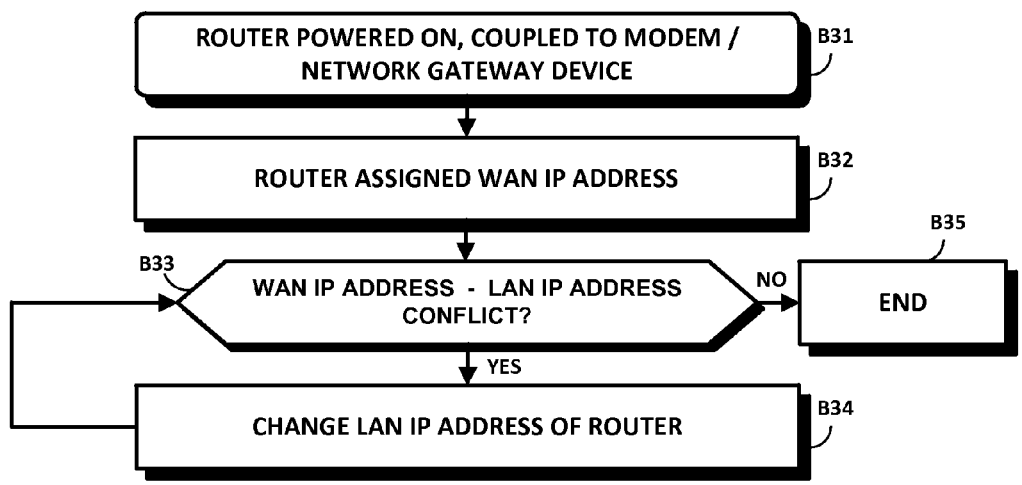
FIG. 3 is a flowchart of a method of configuring a device coupled to a network gateway device, according to one embodiment.

FIG. 3 is a flowchart of a method of configuring a device coupled to a network gateway device, according to one embodiment. In FIG. 3, the initial state of the router is powered on and coupled to the network gateway device, as show at B31. At B32, the router may be assigned a WAN IP address. At B33, it may be determined whether there is a conflict between the assigned WAN IP address and the router's current LAN IP address. For example, the router's current LAN IP address may be a default IP address assigned by the manufacturer and with which the router may be configured, prior to packaging and shipment to a point of sale. Alternatively, the current LAN IP address of the router may be a LAN IP address assigned according to one embodiment. Indeed, if a conflict between the LAN IP address and the assigned WAN IP address is determined to exist in B33 (YES branch of B33), the LAN IP address of the router may be changed, as shown at B34. Flow may then revert back to B33, to determine if the newly-changed LAN IP address conflicts with the assigned WAN IP address. The process may be continued until B33 determines that any previously-existing conflict has been resolved (NO branch of B33), whereupon the router's default or last LAN IP address may be overwritten by current LAN IP address, after which the method may end at B35. A connectivity check may also be carried out, to ensure that the newly-configured router can indeed connect to the network 102 (e.g., connect to the Internet).

Figure 4:
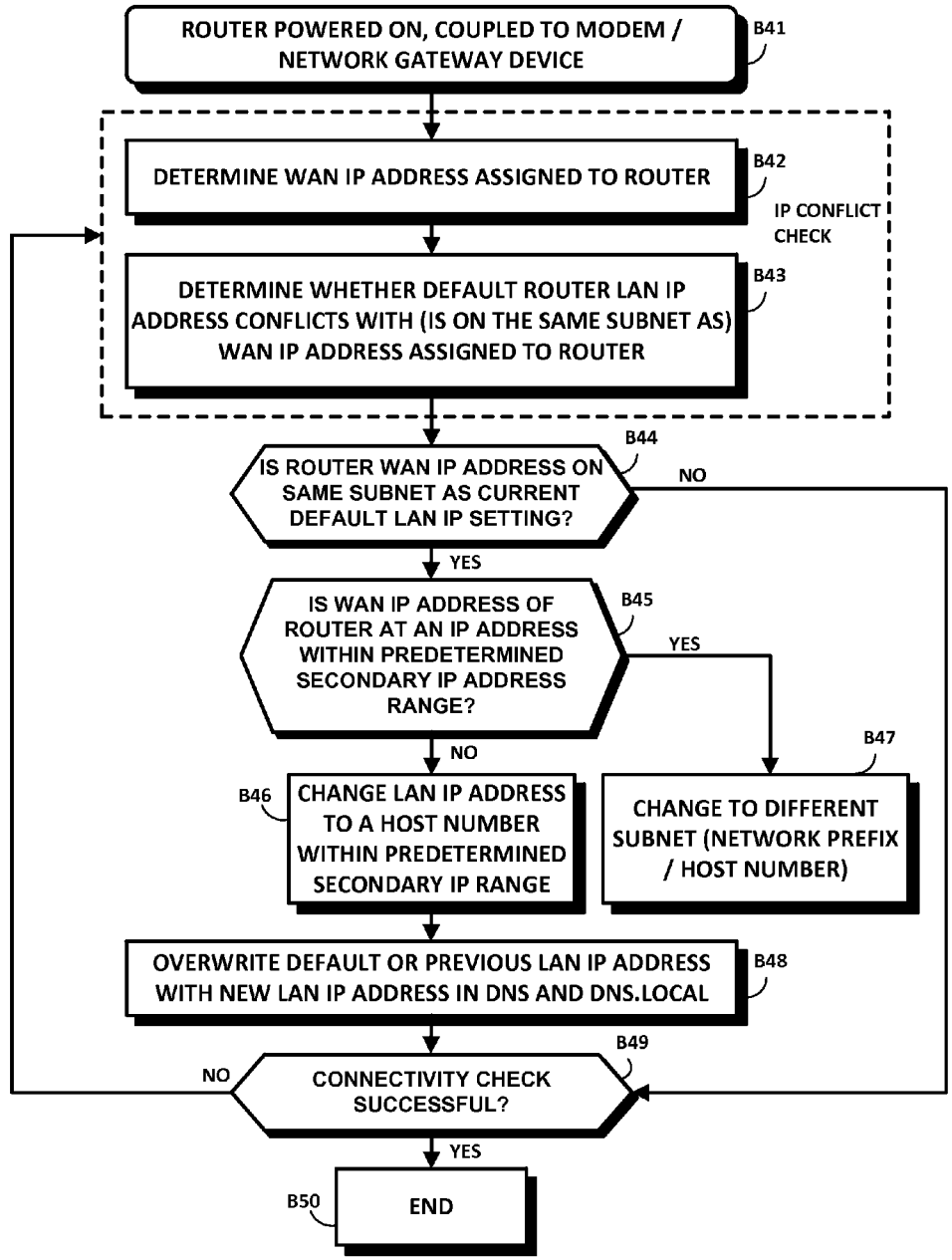
FIG. 4 is a detailed flowchart of a method of configuring a device coupled to a network gateway, according to one embodiment.

FIG. 4 is a detailed flowchart of a method of configuring a device coupled to a network gateway, according to one embodiment. According to one embodiment, the device may comprise a router. As shown in FIG. 4, the initial state of the router is powered on and coupled to the network gateway device, as show at B41. In this state, the router may have been assigned a WAN IP address by the network gateway device. The router may also have been configured with a default LAN IP address by, e.g., the manufacturer or reseller thereof. Different manufacturers often ship their routers with different predetermined LAN IP addresses. According to one embodiment, as soon as the router is powered on and coupled to the network gateway device, an IP conflict check may be carried out. As shown, the IP conflict check may comprise determining a WAN IP address assigned to the router, as shown at B42. Such determining may be carried out by the router interrogating the gateway device and comparing the WAN IP address supplied by the gateway device with its current or factory default LAN IP address. For example, the router may issue the known "Ping" command or may invoke the known "traceroute" utility or other functionally similar command or utility. Thereafter, it may be determined whether the default router LAN IP address conflicts with the WAN IP address that was assigned to the router by the network gateway device. According to one embodiment, this may be carried out by determining if the default router LAN IP address is on the same subnet as the WAN IP address that was assigned to the router by the network gateway device, as shown at B44. If the default router LAN IP address is not on the same subnet as the assigned WAN IP address (NO branch of B44), there is no conflict and a connectivity check may be carried out, as shown at B49. Assuming that the connectivity check in B49 is indeed successful, the method ends at B50.

If, however, the default router LAN IP address is indeed on the same subnet as the WAN IP address that was assigned to the router by the network gateway device (YES branch of B44), then B45 may be carried out. For example, the network gateway device may utilize a WAN IP address within a range of addresses defined by http://192.168.1.x, where x the host number and is represented by any number from 0 to 255. A conflict in this case would exist if the router's LAN IP address were to be on the same subnet (e.g., 192.168.1.x) as is the network gateway device. As a first step to resolve this conflict, B45 calls for a determination whether the assigned WAN IP address of the router is at an IP address within a predetermined secondary IP address range. The assigned WAN IP address of the router may indeed be at an IP address within a predetermined secondary IP address range (YES branch of B45) such as, for example, http://192.168.6.x, then the LAN IP address of the router may be changed to a different subnet (network prefix and host number), as called for by B47. For example, if the assigned WAN IP address of the router is at http://192.168.6.x, then the subnet of the LAN IP address of the router may be changed to, for example, 192.168.7.1, with a subnet mask of 255.255.255.0. If, however, the assigned WAN IP address of the router is not at an IP address within the predetermined secondary IP address range (NO branch of B45), then the LAN IP address of the router may be changed to a host number within predetermined secondary address range, as called for by B46. For example, if the predetermined secondary address range is the range of addresses defined by http://192.168.6.x, then the LAN PI address of the router may be changed to, for example, http://192.168.6.1. As shown at B48, now that the LAN and WAN IP addresses of the router are not in conflict, the (e.g., factory) default or previous LAN IP address of the router may be overwritten with the new LAN IP address selected in B46, as shown at block B48. As earlier, the router may be configured to carry out a connectivity check to ensure network connectivity, as shown at B49. If unsuccessful, the method may revert to the IP conflict check portion of the method, beginning at B42. If the connectivity check of B49 is indeed successful, block B50 may be carried out, signaling the end of the method, according to one embodiment.

According to one embodiment, if the above procedure still fails to resolve an IP address conflict, the router may be taken off DHCP and the router may be switched to the Point-to-point protocol over Ethernet (PPPoE) protocol to attempt to achieve connectivity. According to one embodiment, if PPPoE does not achieve connectivity with the Internet, the router may be returned to the DHCP protocol for further attempts at gaining connectivity, through a connection wizard, for example.

According to one embodiment, the methods detailed herein may be applied when, for example, the user moves to a new home or changes Internet Service Provider (ISP), as the router or router-containing device may then have been assigned a conflicting WAN IP address. Another situation in which the methods detailed herein may be applied is the situation in which the ISP sends the user a new router that is factory-configured with a conflicting WAN IP address. Likewise, the methods detailed herein may also be applied to good advantage should the router be accidently or mistakenly reset to a conflicting IP address.

Figure 5:
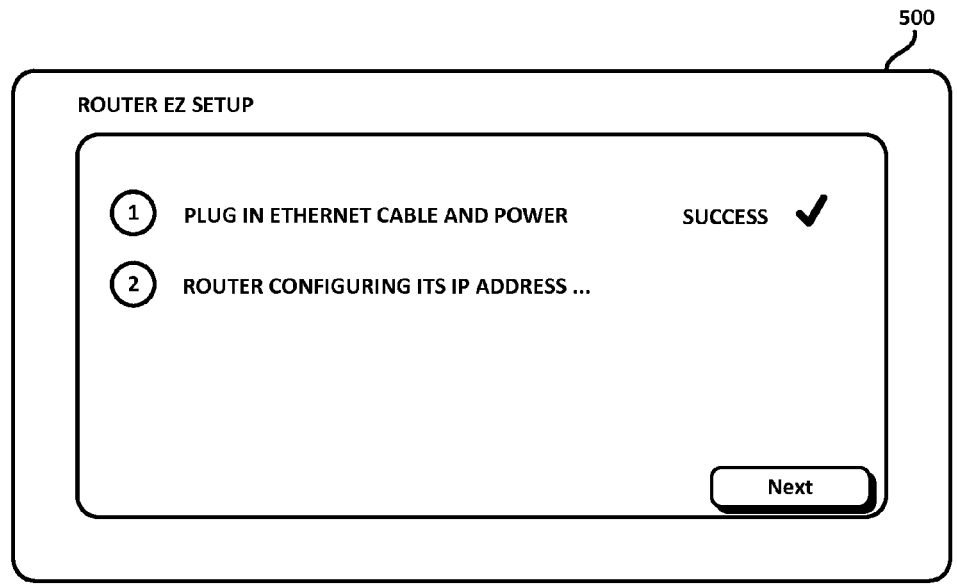
FIG. 5 shows an exemplary UI according to one embodiment.
Figure 6:
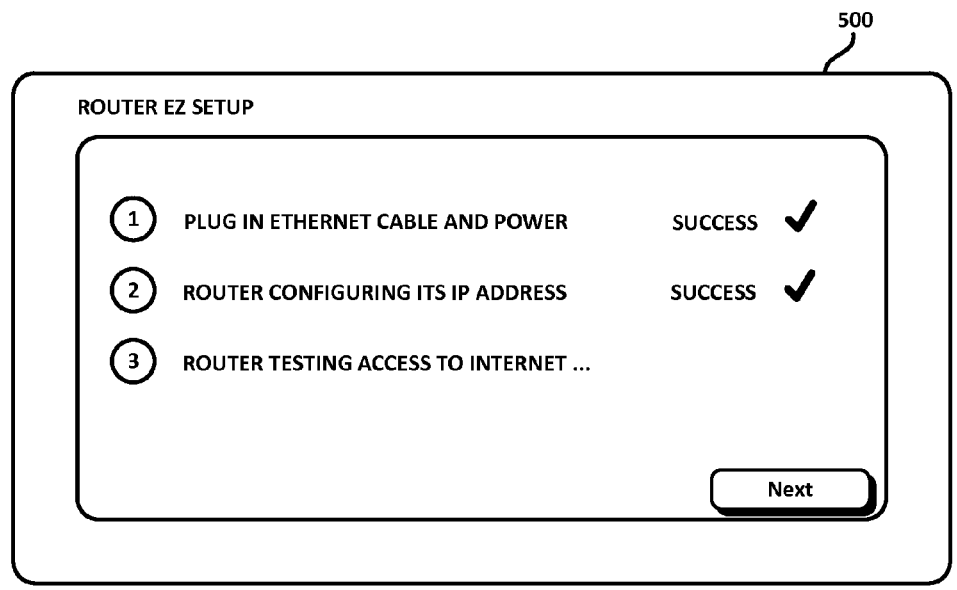
FIG. 6 shows an exemplary UI according to one embodiment.
Figure 7:
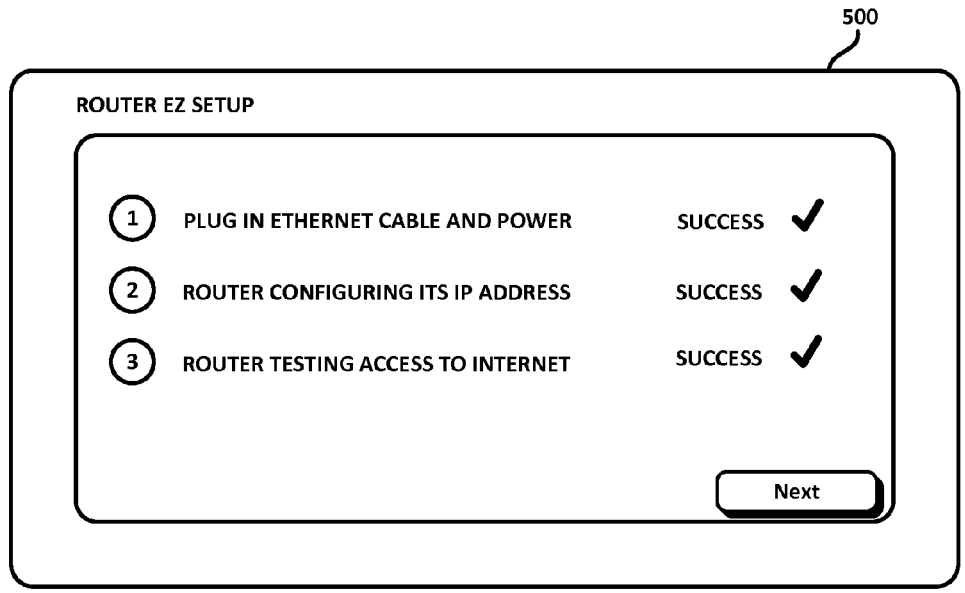
FIG. 7 shows an exemplary UI according to one embodiment.
Figure 8:
FIG. 8 shows an exemplary UI according to one embodiment.

According to one embodiment, the router may be configured to provide installation information to the user during the configuration and installation process. For example, the router may be configured to cause a computing device coupled thereto to display a router setup screen. FIGS. 5-7 show an exemplary UI 500 according to one embodiment. Such a UI 500 may inform the user of the router's progress as it runs through its auto-IP address conflict resolution process, according to one embodiment. For example, the router may display a message informing the user that the router's cabling and power have been configured correctly, as shown in FIG. 5. The router, as also shown in FIG. 5, may display an interim message such as "Router Configuring Its IP Address . . . ", while the router runs through the method according to one embodiment, as detailed herein and shown in FIGS. 3 and 4. A "Success" or like indication may be displayed when the router is successfully configured such that its LAN IP address does not conflict with the WAN IP address, as shown in FIG. 6. As also shown in FIG. 6, the router may display another interim message such as "Router Testing Access to Internet" . . . ", while the router runs carries out, for example, the connectivity check of Block B49 in FIG. 4, according to one embodiment. A "Success" or like indication may be displayed when the router successfully verifies connectivity, as shown in FIG. 7. Finally, a congratulatory or other reassuring message indicating a successful configuration of the router may be displayed for the user, as shown at 800 in FIG. 8.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example,) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method of configuring a device couple to a network gateway, comprising:
   upon the device being assigned a Wide Area Network (WAN) Internet Protocol (IP) address by the gateway device, the device iteratively:
      determining whether a LAN IP address of the device conflicts with the assigned WAN IP address by determining whether the LAN IP address of the device is on a same subnet as the WAN IP address assigned to device;
      determining whether the assigned WAN IP address is within a predetermined secondary LAN IP address range;
      changing the LAN IP address of the device to a different subnet if the assigned WAN IP address is within the predetermined secondary address range; and
      changing the LAN IP address of the device to a host number within the predetermined secondary IP range if the assigned WAN IP address is not within the predetermined secondary LAN IP address range.

2. The method of claim 1, wherein determining comprises the device interrogating the gateway device.

3. The method of claim 2, wherein interrogating comprises one of issuing a "Ping" command and invoking a "traceroute"utility.

4. The method of claim 1, wherein the device is initially configured with a default LAN IP address and wherein determining comprises determining whether the default LAN IP address conflicts with the assigned WAN IP address.

5. The method of claim 4, further comprising overwriting the default LAN IP address of the device with the changed LAN IP address.

6. The method of claim 1, further comprising testing whether the device is configured for communication with the gateway device.

7. The method of claim 1, further comprising routing network traffic between at least one client device and the gateway device.

8. A device configured to couple to a gateway device, the device being configured, upon being assigned a Wide Area Network (WAN) Internet Protocol (IP) address by the gateway device, to iteratively:
   determine whether a LAN IP address of the device conflicts with the assigned WAN IP address by determining whether the LAN IP address of the device is on a same subnet as the WAN IP address assigned to device;
   determine whether the assigned WAN IP address is within a predetermined secondary LAN IP address range;
   change the LAN IP address of the device to a different subnet if the assigned WAN IP address is within the predetermined secondary address range; and
   change the LAN IP address of the device to a host number within the predetermined secondary IP range if the assigned WAN IP address is not within the predetermined secondary LAN IP address range.

9. The device of claim 8, wherein the device is further configured to interrogate the gateway device upon being assigned a WAN IP address h the gateway device to determine whether the LAN IP address of the device conflicts with the assigned WAN IP address.

10. The device of claim 9, wherein the device is configured to interrogate the gateway device by issuing a "Ping." command or by invoking a "traceroute" utility.

11. The device of claim 8, wherein the device is initially configured with a default LAN IP address and is further configured to determine whether the default LAN IP address conflicts with the assigned WAN IP address.

12. The device of claim 11, wherein the device is further configured to overwrite the default LAN IP address of the device with the changed LAN IP address.

13. The device of claim 8, wherein the device is further configured to test whether the device is configured for communication with the gateway device.

14. The device of claim 8, wherein the device is further configured to route network traffic between at least one client device and the gateway device.

* * * * *